United States Patent [19]
Cricchi et al.

[11] 3,895,360
[45] July 15, 1975

[54] BLOCK ORIENTED RANDOM ACCESS MEMORY

[75] Inventors: James Ronald Cricchi, Baltimore; Franklyn C. Blaha, Glen Burnie, both of Md.

[73] Assignee: Westinghouse Electric Corporation, Pittsburgh, Pa.

[22] Filed: Jan. 29, 1974

[21] Appl. No.: 437,649

[52] U.S. Cl. ... 340/173 R; 340/172.5; 340/173 AM
[51] Int. Cl. ... G11c 11/40
[58] Field of Search ...... 340/173 R, 172.5, 173 AM

[56] References Cited

UNITED STATES PATENTS 3,742,460 6/1973 Englund ... 340/173 AM

*Primary Examiner*—Terrell W. Fears
*Attorney, Agent, or Firm*—J. B. Hinson

[57] ABSTRACT

A block oriented random access memory (BORAM) is disclosed as comprising a plurality of memory arrays of metal-nitride-oxide semiconductor (MNOS) memory elements. Each memory array includes a plurality of the MNOS memory elements disposed in rows and columns, and serial or sequential means such as a shift register for writing and reading data to and from the memory elements through column conductors associated with each column of the memory elements. A temporary storage means such as a latch is inserted between each stage of the shift register and the column conductor, whereby a multiplexing function can be performed between the stage outputs of the shift register and the columns of the memory elements. Address means is provided for the rows of memory elements, whereby a row may be selected for entry of data through its associated column conductor. In one illustrative embodiment, a plurality of such assemblies is assembled into a block capable of being separately addressed, wherein each such assembly is capable of storing one bit of a multi-bit word of data. In turn, a plurality of such blocks is assembled to form the block oriented random access memory, wherein each such block may be randomly accessed, and the data therein sequentially read and written.

17 Claims, 32 Drawing Figures

| TYPICAL VALUES |
|---|
| $V_W = -25^V$ |
| $V_R = -15^V$ |
| $V_{TH}(LOW) = -3^V$ |
| $V_{TH}(HIGH) = -10^V$ |
| $V_{CL} = -25\,V$ |
| $V_D \approx -25\,V$ |

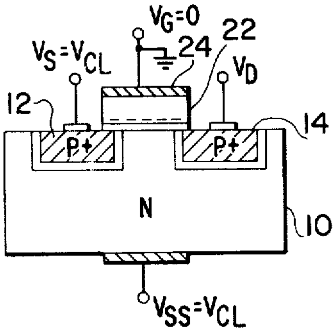

FIG. 2A
CLEAR/WRITE "1"

| $V_I = -V_{SS} = +25^V$ |
|---|
| ΔV SHIFTS POS. TO "1" STATE $V_{TH} = -3^V$ |

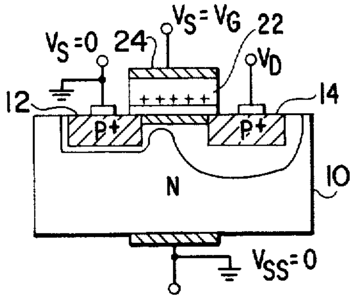

FIG. 2B
WRITE "0"

| $V_I = V_W = -25^V$ |
|---|
| ΔV SHIFTS NEG. TO "0" STATE $V_{TH} = -10^V$ |

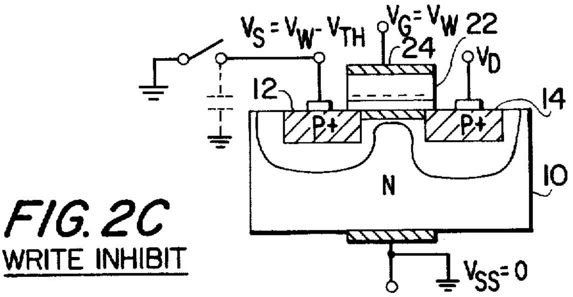

FIG. 2C
WRITE INHIBIT

| $V_I = V_{TH}$ |
|---|
| ΔV REMAINS THE SAME (NO CHANGE) $V_{TH} = -3^V$ |

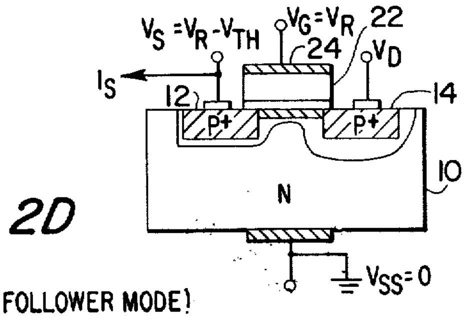

FIG. 2D
READ
(SOURCE FOLLOWER MODE)

| $V_I = V_{TH}$ |
|---|
| EITHER $V_S = V_R - V_{TH}$ OR $I_S$ SENSED TO DETERMINE STATE OF MEMORY CELL |

BLOCK ORIENTED RANDOM ACCESS MEMORY

CROSS-REFERENCE TO RELATED APPLICATIONS

Reference is made to the following related patent applications, each of which is assigned to the present Assignee:

Ser. No. 435,552 entitled "MNOS/SOS RAM With Symmetrical Charge Enhancement Read and Write Modes", filed Jan. 22, 1974 in the name of J. R. Cricchi;

Application Ser. No. 219,463, entitled "Enhancement Limited MNOS Memory Device", filed Jan. 20, 1972 in the name of J. R. Cricchi; and Ser. No. 437,650 , entitled "The Structure of and the Method of Processing a Semiconductor Matrix of MNOS Memory Elements", filed concurrently herewith in the names of J. R. Cricchi & B.W.Ruehling.

BACKGROUND OF THE INVENTION

1. Field of the Invention

This invention relates generally to semiconductor memory arrays and more particularly to a block oriented random access memory (BORAM) including a plurality of randomly accessible blocks, each block comprised of non-volatile MNOS memory elements connected in a matrix array.

2. Description of the Prior Art

A well-known transistor memory element currently utilized in semiconductor memories is the metal-nitride-oxide semiconductor (MNOS) transistor. This device is a standard insulated gate field effect transistor in which the silicon dioxide gate insulator is replaced by a double insulator, typically a layer of silicon dioxide nearest the silicon substrate and a layer of silicon nitride over the silicon dioxide. Memory is obtained in an MNOS element by electrically reversible tunnelling of charge from the silicon to "traps" of electrical charge at the silicon dioxide-silicon nitride interface. The threshold voltage or the voltage applied to the gate which initiates current flow between the drain and source electrodes is influenced by the charge state of the traps. These traps are conventionally charged and discharged by the application of a sufficiently large polarizing voltage of predetermined polarity coupled across the gate electrode and substrate. Information is read out of the device by way of the source and drain electrodes.

In an MNOS memory element having, for example, an N-type substrate and P-type source and drain regions, application of a relatively large positive polarizing potential applied to the gate when the substrate is at ground potential (or a negative potential to the substrate when the gate is at ground potential) will charge the traps negatively and cause a permanent P-type channel to exist between the drain and source electrodes and thereby establish a first or low threshold state. This state is defined as the binary "1" state as well as the CLEAR or ERASE state. Reversal of the aforesaid relatively large polarizing potential, i.e. applying a large negative potential to the gate with the substrate set at ground, will charge the traps positively forming an N-type channel between the source and drain and establishing a second or a high threshold state defined as the binary "0" state. Thereafter, current can be made to flow or remain cut-off between the source and drain by the reapplication of a suitable lower bias potential termed the "read bias potential". The state of the memory element therefore may be read either of two means, voltage sensing or current sensing. If the element is operated as a source follower, the voltage at the source is a direct measurement of the memory element state.

In the above-identified, co-pending application Ser. No. 219,463, filed Jan. 20, 1972, there is described an MNOS memory element wherein the thickness of the silicon dioxide layer over the source and drain regions is great enough to prevent tunneling therethrough at a predetermined polarizing voltage. However. between the source and drain regions, the thickness of the silicon dioxide layer is reduced to a value which will permit tunneling therethrough at the aforesaid predetermined polarizing voltage. This ensures that the memory device will always operate in the enhancement mode, i.e. the device normally non-conducting but can be rendered conductive by the application of a suitable potential to the gate. At the same time, the increased thickness of the oxide over the source and drain regions increases the gate-to-drain and gate-to-source breakdown voltages, thereby reducing capacitive feedthrough and increasing the performance characteristics of the device. A similar, non-volatile memory element utilizing MNOS transistors is disclosed, for example, in U.S. Pat. No. 3,651,492, issued to George C. Lockwood.

Further, it is known to assemble a plurality of semiconductor memory elements into an array and to provide additional circuitry for randomly accessing the memory elements, such structure and operation are disclosed in U.S. Pat. No. 3,691,537, issued to James F. Burgess et al. A further example of a random access memory incorporating an array of MNOS memory elements is set out in the above-identified co-pending application Ser. No. 435,552. In this application, there is described a matrix array comprising a plurality of common source-substrate connected MNOS memory transistor elements having silicon on sapphire substrates and sources selectively coupled in a source follower mode by address means to a first circuit node of a crosscoupled bistable latch circuit also comprised of MNOS devices. A second circuit node is coupled back to each of the gate electrodes of the plurality of memory transistors by means of a voltage divider consisting of a pair of MNOS load elements. The addressed transistor memory element comprises a node charging path in combination with a parallel MNOS load element forming a second node charging path, whereupon the voltage at said first circuit node during the READ mode is a function of the threshold state of the memory element to set the bistable latch. Input data is written into an addressed memory element by applying an input data signal to the second circuit node again setting the bistable latch. The voltage at the second circuit node is coupled to the gate and then by applying a subsequent memory pulse to the circuit, a polarizing voltage of proper polarity is established between the gate and drain to establish either a low or high threshold state in the memory element. The load elements coupled to the first and second circuit nodes preserve the DC or static circuit conditions. The READ and WRITE voltages present in the element configuration act to enhance the high threshold memory state of the address memory elements in the high threshold state and minimize the change of the charge stored by the non-addressed elements during both the READ and WRITE modes due to the unique coupling of all the gates to the second circuit node and the source follower coupling of the commonly connected source-substrates.

The random access memories incorporating MNOS memory elements as described above, are limited as to the quantity of data that may be stored therein. In the prior art, when it has been desired to store mass blocks of data, such memory systems as magnetic disc, drum or tape memories have been used. For example, a disc system comprises a plurality of magnetic discs, each of which may be accessed by a transducer mechanically driven from disc to disc and from section to section of the accessed disc. Typically, in accessing data from such a large memory system, the transducer is moved mechanically to a selected block of data, i.e. randomly accessing that data, and thereafter, the data within that portion or block is read or written in a sequential or serial fashion. This type of mass data memory is known as a block oriented random access memory (BORAM) and has in the prior art typically included mechanically-moving parts. As a result, such BORAM memory systems have involved an initial high cost as well as continuing high maintenance costs. In addition, due to the incorporation of the mechanically-moving parts to randomly access a block of data, these BORAM systems typically have been quite large and are not, in the conventional sense, considered portable.

SUMMARY OF THE INVENTION

It is therefore a primary object of this invention to incorporate an MNOS memory element into a memory matrix capable of serially or sequentially being read and written with data.

It is a further object of this invention to utilize such a plurality of memory matrices of MNOS memory elements in a block oriented random access memory system, wherein a selected block of the memory matrices is capable of being accessed to read data from or write data on the memory matrix in a sequential fashion.

These and other objects are accomplished in accordance with teachings of this invention by providing a matrix memory array comprising a plurality of MNOS memory elements disposed in columns and rows, sequential storage means such as a shift register for sequentially reading in or writing out data via the column conductors associated with the memory elements, and address circuitry responsive to address signals for selectively enabling one of the rows of memory elements, whereby a selected row of memory elements is enabled to be read or written upon. A temporary data storage latch, described herein as a column detection and storage circuit, is incorporated between the shift register and the columns of the memory elements to facilitate a multiplexing function between the output data terminals of the shift register and the MNOS memory elements.

In a further aspect of this invention, a plurality of such memory matrices is incorporated into a memory block, each memory matrix storing a bit of a memory word. A plurality of such memory blocks is provided with each memory block capable of being randomly accessed and the data in the form of words written or read therefrom; each memory matrix of the accessed block provides a bit of the word in parallel with the other memory matrices, the bits from all of the matrices of a block forming a word.

BRIEF DESCRIPTION OF THE DRAWINGS

These and other objects and advantages of the present invention will become more apparent by referring to the following detailed description and accompanying drawings, in which:

FIGS. 2A to 2D are simplified diagrams illustrative of the MNOS transistor memory element as shown in FIG. 1A, and its various modes of operation;

DESCRIPTION OF THE PREFERRED EMBODIMENT

Figures 1A, 1B, 7:
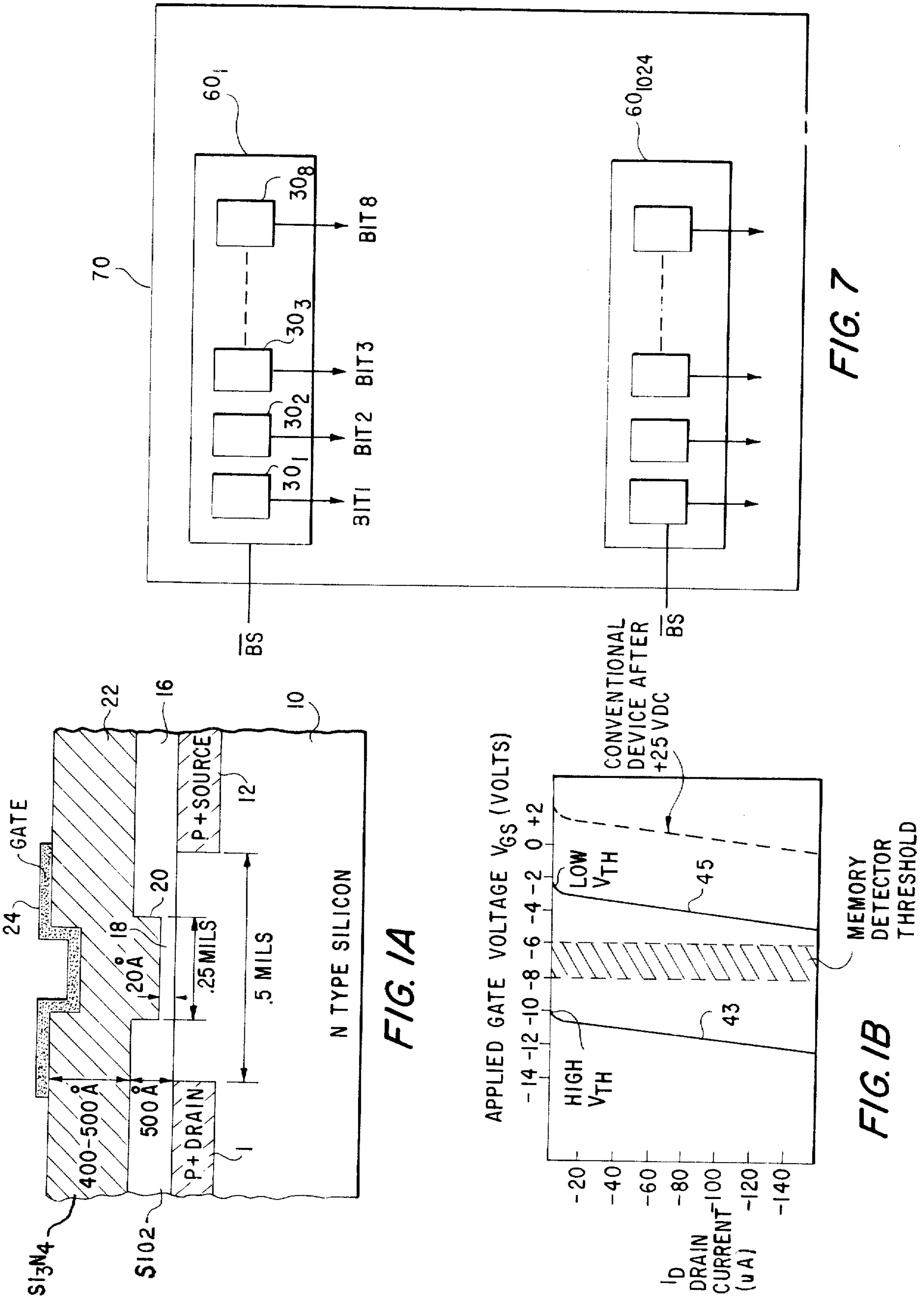
FIG. 1A is a cross-sectional view of an enhancement mode limited MNOS transistor, to be used in a memory matrix in accordance with teachings of this invention.
FIG. 1B is a graph illustrative of the drain-to-source current versus gate voltage of the MNOS memory element shown in FIG. 1A.
FIG. 7 is a block diagram showing the arrangement of the memory assemblies as shown in FIGS. 3 and 4A, into a memory block and the arrangement of a plurality of such memory blocks, whereby each of the memory blocks may be randomly accessed and the data therein sequentially read or written.

The subject invention will be described with respect to the enclosed drawings in a manner such that the organization of the memory elements into a matrix and into a memory assembly, as well as into a BORAM system, will be orderly and clear. First, there will be described the particular structure, and the mode and theory of operation of an MNOS transistor, which forms the basic memory element of the BORAM of this invention, with respect to FIGS. 1A and 1B and 2A to 2D. Next, the organization of such a memory element into a memory matrix array and into an assembly including such an array, as well as the operation of the assembly, will be described with respect to FIGS. 3, 4A and 4B, 5A to 5I and 6A to 6I. Thereafter, the organization of a plurality of such memory assemblies into blocks thereof and the organization of a plurality of such blocks, whereby each block is capable of being randomly accessed and data read or written sequentially upon or from the accessed block will be explained with respect to FIG. 7. In order to provide a complete description of the subject invention, the detailed circuit arrangement of the row decode buffer, address enable buffer, the row decoder, the input driver, the output driver, the block select buffer, the shift register, the transfer gate and the column detection and store circuits, will be described briefly. In addition, the description of the semiconductor structure and the method of manufacturing same as set out in the above-identified, concurrently-filed application of Cricchi and Ruehling, are incorporated herein, specifically by reference.

MNOS Structure and Method of Operation

First, with respect to FIG. 1A, there is disclosed an enhancement mode limited metal-nitride-oxide semiconductor element, hereinafter referred to simply as an MNOS, which includes a substrate 10 of N-type silicon having P+ source and drain regions 12 and 14 diffused into the upper surface thereof and separated by space typically of a width in the order of 0.5 mils. Deposited on the upper surface of the substrate 10 is a layer 16 of silicon dioxide $SiO_2$ having a thickness over the source and drain regions in the order of 500 angstrom units (A). Intermediate the source and drain regions 12 and 14 is a reduced thickness region 18 in the order of 20 A and having a width in the order of 0.25 mils. Covering the silicon dioxide layer 16 and including the well 20 formed by the reduced thickness region 18, is a layer 22 of silicon nitride $Si_3N_4$ followed by a gate electrode 24 of aluminum or some other similar type of material deposited on the upper surface of the silicon nitride layer 22 and spanning the gate region defined between the source and drain regions 12 and 14. Such a device is termed a drain-source protected MNOS memory element and is more fully described in the aforesaid co-pending application Ser. No. 219,463, filed Jan. 20, 1972.

The transfer characteristic illustrated in FIG. 1B illustrates drain-to-source current plotted against gate-to-substrate voltage of the MNOS memory element. When a positive bias voltage $V_{GSS}$ of, for example, +25 V relative to the substrate, is applied to the gate, a transfer curve appears as at 45 establishing what is termed as the "low" threshold state, meaning that once the bias voltage of +25 V is removed, drain-source current will occur only when the bias voltage is again increased to the low threshold value. If, on the other hand, the bias voltage is initially reversed, such that −25 V is applied to the gate relative to the substrate, the transfer characteristic changes to that as indicated by reference numeral 43. This is referred to as the "high" threshold state. Accordingly, the two distinct threshold states possible provide a binary capability such that the low threshold state, when established, can represent a binary 1 whereas the establishing of the high threshold state can represent a binary 0 value. Accordingly, memory is obtained in the drain-source protected memory element such as shown in FIG. 1A, by electrically reversible tunnelling of charge from the silicon to deep traps at the silicon dioxide-silicon nitride interface in the thin oxide portion of the gate only.

Referring now to FIGS. 2A to 2D, there is disclosed the four operating modes of a P-channel MNOS memory element as contemplated by the subject invention. Equating the writing of the binary 1 state with the "ERASE" or "CLEAR" operation, as shown in FIG. 2A, the MNOS memory element can be made to establish the low threshold state by grounding the gate electrode, i.e. making it approximately 0 V and applying a negative voltage $V_{CL} = -25$ V, called the polarizing voltage, to the substrate. Thus, the gate voltage $V_G = 0$ and the substrate voltage $V_{SS} = V_{CL} = -25$ V. Accordingly, the voltage across the gate insulator $V_I = -V_{SS} = +25$ V. Tunnelling occurs in the N oxide region of the gate, leaving a net negative charge near the nitride-oxide interface which creates an inversion layer in the silicon in that region. Because there in now a region of inversion interposed between the source and drain, the threshold voltage will be determined by the thick oxide portion of the gate, whereupon a low threshold voltage $V_{TH} = -3$ V, is established.

As noted above, the high threshold value can be established in a WRITE mode, as shown in FIG. 2B, by grounding the substrate and the source while applying the negative voltage $V_W = -25$ V to the gate. In this condition, it can be shown that the voltage across the gate insulator now becomes $V_I = V_W = -25$ V. Tunnelling occurs in the nitride-oxide interface traps at the thin oxide portion of the gate resulting in a net positive charge. This causes an accumulation layer at the silicon surface to be interposed between the source and drain of the transistor, resulting in the threshold voltage $V_{TH}$ being shifted to $V_{TH} = -10$ V. The threshold of the memory element in this situation is determined by that of a thin oxide region of the gate rather than the thick oxide region. It should be noted that in both of the CLEAR and WRITE modes, the substrate and the source are at the same voltage, while the voltage $V_D$ applied to the drain in both instances is equal to substantially −25 V.

An important third condition is called the "WRITE INHIBIT" mode, which occurs, as will be explained, when non-addressed memory elements have their source electrodes open circuited. There still exists, however, a distributed capacitance to ground at the source. The voltage conditions for the WRITE INHIBIT mode are illustrated in FIG. 2C. Since the source follows the applied gate voltage very closely, the condition where the substrate is grounded, and the applied gate potential $V_W = -25$ V, the voltage across the channel varies between the source voltage $V_S = V_W - V_{TH}$ and the voltage at the drain $V_D$. Therefore, the voltage across the reduced oxide portion is very nearly equal to the threshold voltage $V_{TH} = -3$ V. Since this is not enough to change the memory state, the low threshold state is preserved. By connecting the substrate to the source, charge enhancement takes place as will be discussed subsequently.

The state of the MNOS memory element can be read in either of two ways. One method is by voltage sensing the voltage at the source while connected in a voltage follower configuration or by sensing the current flow when the bias voltage is reapplied after establishing either a low or high threshold state during the WRITE mode. The device is operated as a source follower in the READ mode as shown in FIG. 2D, wherein the voltage $V_S$ at the source varies as $V_S = V_R - V_{TH}$ where $V_R$ is typically −15 V. Accordingly, $V_{TH} \cong V_I$ and corresponds to −3 V in the low threshold state, and −10 V in the high threshold state, and therefore the application of the read voltage $V_R$ enhances the high threshold state during the READ mode.

Memory Assembly

Figures 3, 4B:
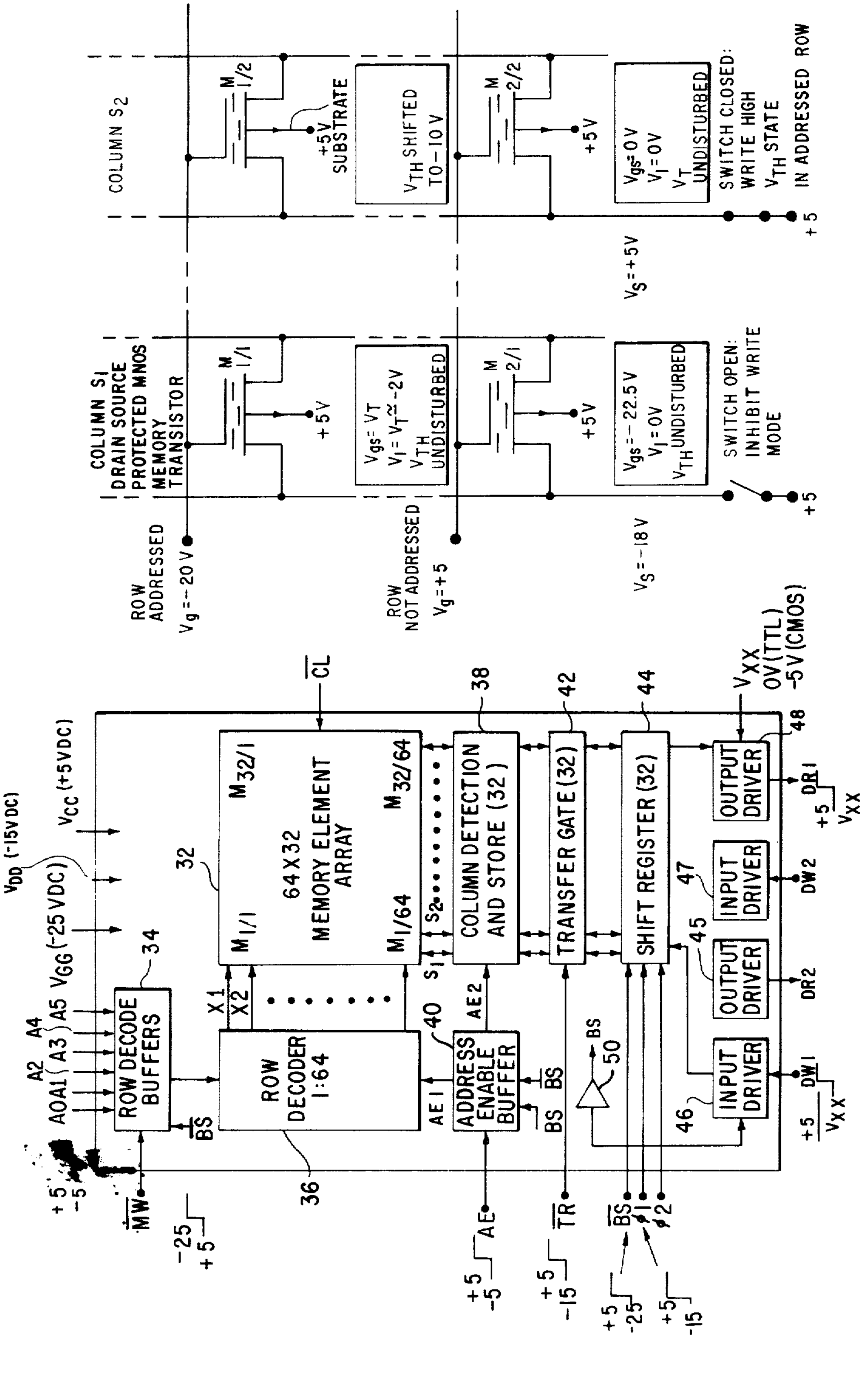
FIG. 3 is a block diagram illustrating an assembly comprising the memory matrix array of the MNOS transistor memory elements as shown in FIG. 1A, the address circuitry and the sequential storage circuitry, whereby data may be written into and read from the memory matrix array in accordance with the teachings of this invention.
FIG. 4B is a partial view of the memory matrix illustrating the WRITE mode in which data is written onto the memory elements.
Figure 4A:
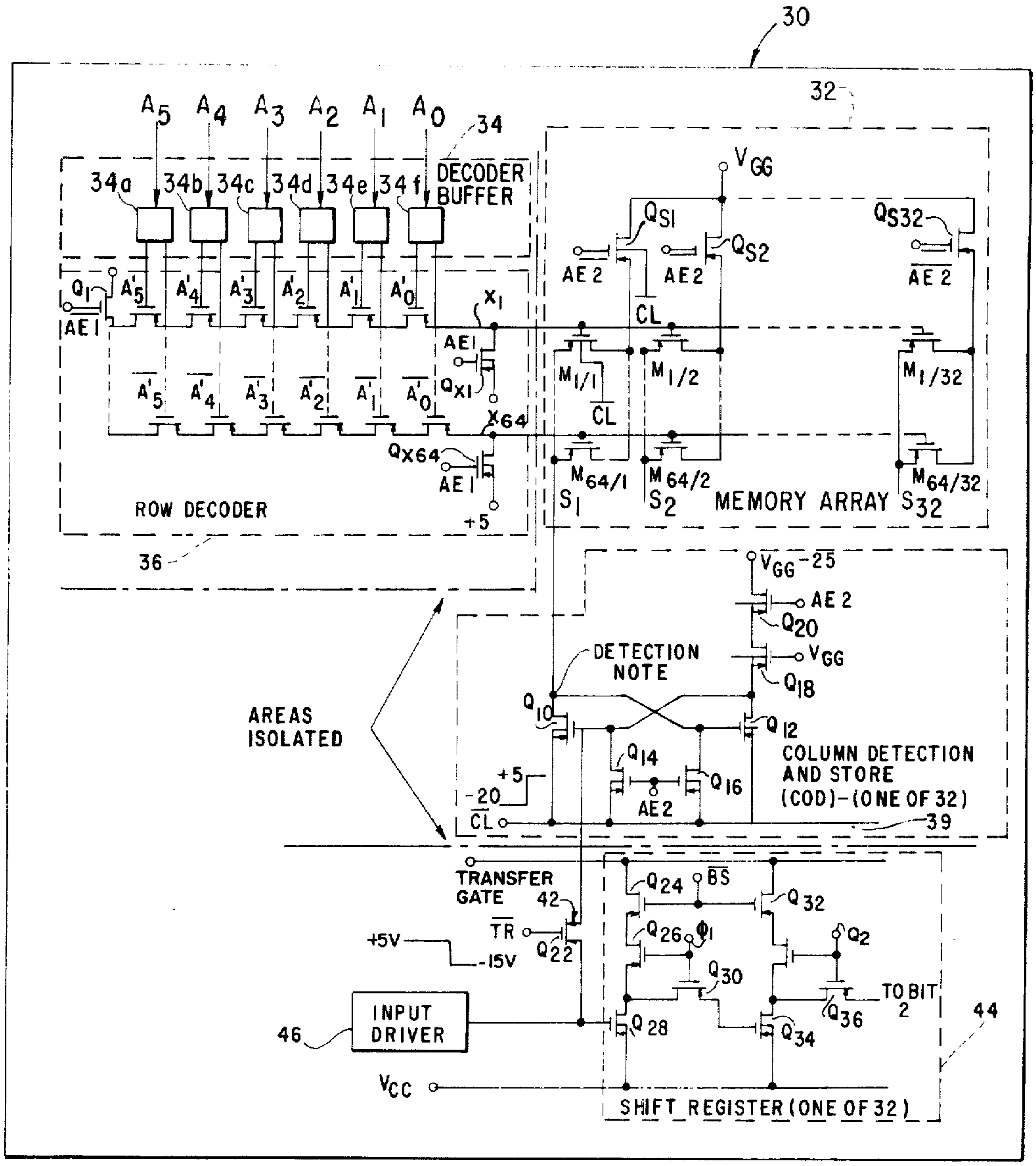
FIG. 4A is a detailed schematic diagram showing the circuit elements of the various block diagrams of the assembly shown in FIG. 3.
Figure 5:
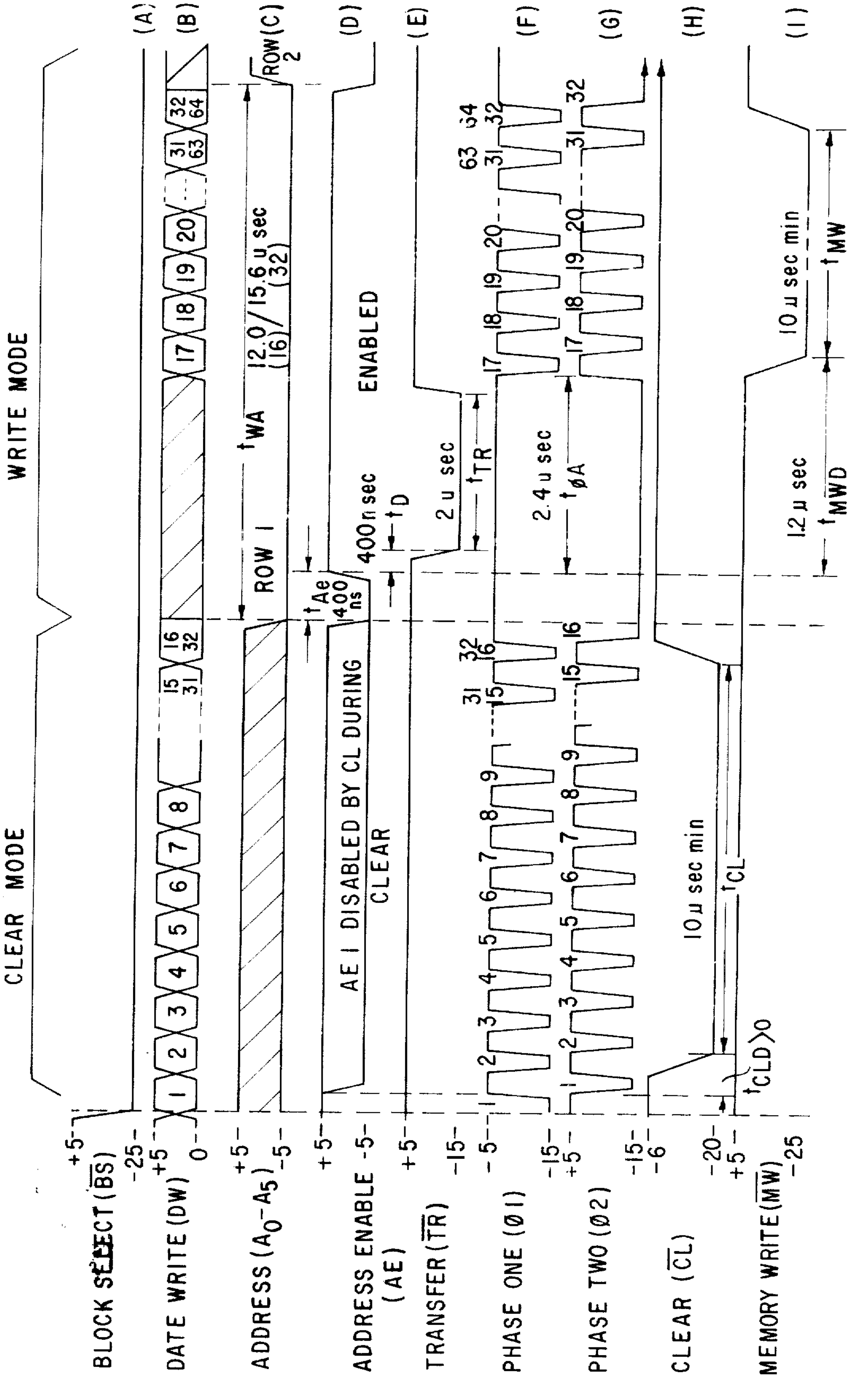
FIGS. 5A to 5I, and 6A to 6I show the waveforms of the signals applied to write and read data, respectively, upon the memory assembly as shown in FIGS. 3 and 4A and 4B.
Figure 8:
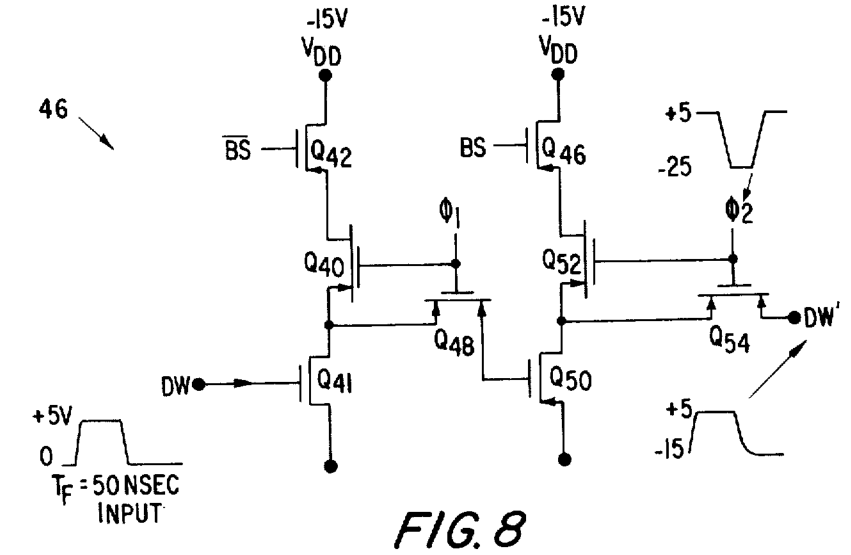
FIG. 8 is a schematic diagram showing the detailed circuit elements of the input drivers diagrammatically shown in FIG. 3.

The manner in which the memory elements as shown in FIGS. 1A, and 2A to 2D, are incorporated into a memory assembly 30, will be explained, first, generally with respect to FIG. 3 and then in detail with respect to FIGS. 4A and 4B. The memory assembly 30 includes a memory matrix array 32 comprised of a plurality of memory elements taking the form of the MNOS transistor as shown in FIG. 1A, disposed in columns and rows as shown in FIGS. 4A and 4B. Illustratively as shown in FIGS. 4A and 4B, the memory elements designated by the letter "*m*", are disposed in an array of 32 columns-by-34 rows, thus comprising 2,048 MNOS memory elements as described above. As will be explained in detail later, the memory assembly 30 is incorporated into a BORAM memory system comprising a plurality of such assemblies 30. In order to randomly access one of the blocks (including a plurality of the memory assemblies 30), a block-select signal $\overline{BS}$ is generated as shown in FIG. 5A and is applied as shown in FIG. 3 to an input driver circuit 46. As a result, the input 46, the circuit details of which will be explained in detail later with respect to FIG. 8, is enabled to permit the application of the binary data-write signals DW, shown in FIG. 5B, through the input driver circuit 46 to a sequential or serial storage means illustratively taking the form of a shift register 44. The shift register 44 includes 32 stages corresponding to the 32 columns of the memory matrix array 32. A clock signal of a frequency $f_c$ (not shown) is applied to the input driver circuit 46 to permit the data-write signals to be loaded into the register at the clock frequency $F_c$. Further, shift signals of phase 1 and phase 2, as seen respectively in FIGS. 5F and 5G, are applied to the shift register 44 to permit the serial entry and shift from stage to stage within the shift register of the data-write signals DW. At the end of 32 clock periods, the input data, comprising the data-write signald DW, are placed in each of the 32 stages of the shift register and are ready to be transferred through a transfer gate 42 and a column detection and store circuit 38 to the columns of the memory matrix array 32. As will be explained in detail later, the transfer gate circuit 42 permits, in response to a transfer signal $\overline{TR}$, the 32 bits of data as stored in the shift register 44 to be transferred to the column detection and store circuit 38 to be stored for a period of time corresponding to 32 times the clock period. As a result, a multiplexing function is contemplated by this invention to lower the speed at which the rows need to be addressed and thus minimize the power required and the size of the assembly 30. Further, the column detection and store circuit 38 permits an extended writing period longer than that required to shift the 32 bits of data as stored in the shift register 44 to the column detection and store circuit 38. In addition, the input binary signal may be applied to the shift register 44, while previously-entered data is being written onto the memory elements. Given an input data rate of $f$, data transfer between the column detection and store circuit 38 and the shift register 44 occurs at a rate of $f/32$. Thus, the rows are decoded at $f/32$, and all of the memory elements in a row are electrically written or read out at $f/32$. The process for clearing and writing the data signals as stored in the column detection and store circuit 38 will be explained in detail with respect to FIG. 4A.

Figure 9:
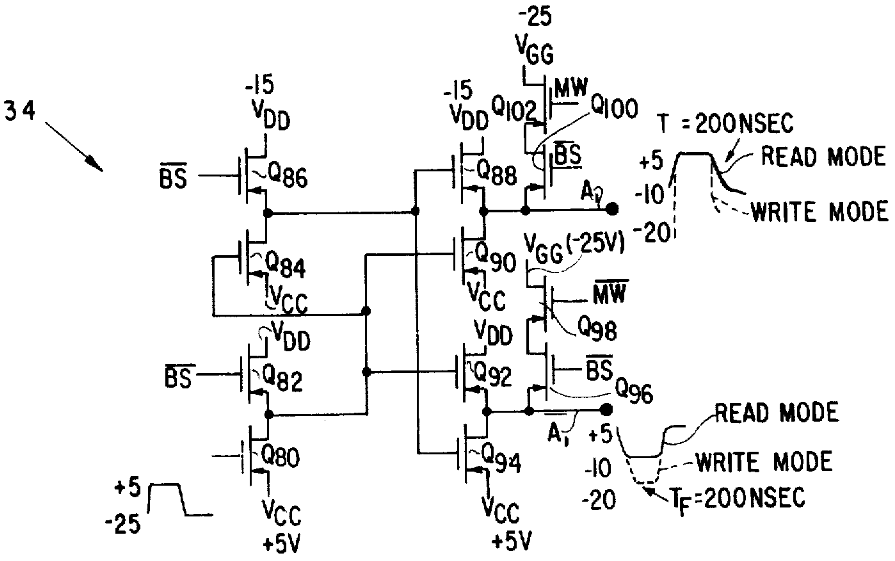
FIG. 9 is a schematic showing of the circuit details of the row decode buffer shown diagramatically in FIG. 3.

To permit the reading or writing of the memory elements upon one of the rows $X_1$ to $X_{64}$ of the memory matrix array 32, address signals $A_0$ to $A_5$ are applied to row decode buffers 34, which are shown in detail in FIG. 9. The stored addresses in turn are applied to a row decoder 36, generally shown in FIG. 3, and shown in detail in FIG. 4A. The row decoder 36 generally takes the form of a decode tree and responds to the addresses $A_0$ to and $A_5$ to selectively enable or energize one of the rows $X_1$ to $X_{64}$, whereby data may be written onto or read from the memory elements within the selected row. Further, there is provided an address enable buffer, responsive to an address enable signal AE, shown in FIG. 5D, to generate in sequence address enable signals AE1 and AE2. The address enable (AE) signals are delayed from the address signals ($A_0$ to $A_5$) to minimize address crossover feedthrough. The addressed row ($X_1$ to $X_{64}$) is selected when AE goes high (+5 V). The detailed structure of the address enable buffer will be more fully described with respect to FIG. 10.

In the READ mode, as will be explained in detail later, the stored data is transferred from a selected row of the memory elements and is detected by the column detection and store circuit 38. Subsequently, the data is transferred in parallel by the transfer gate 42 to the shift register 44. Thereupon the shift register is actuated to serially read out the stored data through an output driver 48. The detailed structure of the output driver 48 will be explained later with respect to FIG. 11. Alternatively, a second output driver 49 and a second output driver 47, similar to those previously described, may be used to increase the rate and quantity of data input and output from the memory assembly 30.

The operation of the memory assembly 30 in its four modes, ERASE or CLEAR, WRITE, WRITE-INHIBIT, and READ, now will be explained in more detail with respect to FIGS. 4A and 4B, and FIGS. 2A to 2D. The ERASE mode is effected by applying a negative voltage from the substrate to the gate of the MNOS memory element, whereby the memory element is disposed in its low threshold state. In order to write data upon the memory element, a negative voltage is applied from the gate to the substrate, whereby the MNOS memory element is disposed in its high threshold state. During the writing operation, selected memory elements are disposed in their high threshold state, whereas the remaining elements are left in their low threshold state; as a result, at the end of the writing operation, the memory elements are disposed variously in their high threshold state and in their low threshold state, dependent upon the data to be written onto the memory assembly 30. The WRITE-INHIBIT mode corresponds to that mode of operation effected during writing, wherein a negative writing potential is applied to the gate electrode, and the source electrode of the memory element is permitted to charge to a voltage corresponding to the difference between the negative writing voltage and the threshold voltage established upon the memory element. As explained above, the difference between the source and gate voltages is insufficient to cause the memory element to be written upon and thus remains in its low threshold state. In order to read data from the memory element, a read bias voltage is applied to the gate of the memory element, and the potential to which the source charges is indicative of the state in which the memory element has been disposed.

The CLEAR and WRITE modes of operation of the memory assembly 30 now will be explained with respect to FIGS. 4A, 4B, and 5A to 5I. The first step in writing data into the memory elements *m* of the memory matrix array 32 is to clear the memory array elements to the low threshold or logic 1 state. This is accomplished by clamping the gates of the memory elements *m* to a positive bias potential $V_{CC}$, illustratively taking the value of +5 V, while the substrate common to each of the memory elements *m* is biased negative by the clear signal $\overline{CL}$ applied for a period $t_{CL}$ illustratively taking the value of 10 microseconds, as shown in FIG. 5H. As shown in FIG. 4A, each of the FET's forming the memory elements *m* has a fourth terminal connected to its substrate. The fourth substrate terminal is connected to the $\overline{CL}$ conductor 39 so that, in a manner to be explained, the $\overline{CL}$ signal may be applied during the CLEAR operation to the substrates of each of the memory elements. As further illustrated by the dot-dash lines in FIG. 4A, the portion of the assembly 30 upon which the column detection and store circuit 38 and the memory array 32 are formed, is isolated from each of the remaining portions upon which the row decoder 36, and the shift register 44 and the input and output drivers are formed, respectively. In particular, the AE1 signal is applied to the gates of clamping field effect transistors (FET's) $Q_{X1}$ to $Q_{X64}$ to render these transistors conductive and thereby apply the biasing voltage $V_{CC}$ to the gates of each of the memory elements *m* within the memory matrix array 32, as through the respective load conductors $X_1$ to $X_{64}$. Further, the address enable signal $\overline{AE2}$ is applied to an FET $Q_{14}$, connecting the gate of a transistor $Q_{10}$ to the negative potential of the clear siganl $\overline{CL}$, having an illustrative value of −20 V, whereby the transistor $Q_{10}$ is turned off.

The output signals of the row decode buffers 34 provide signals to charge the gates of the decode tree FET's $A_0'$ to $A_5'$ such that a branch of the decode tree transistors corresponding to one matrix row are rendered conductive, whereby one row of the 64 rows is selected or addressed. As shown in FIGS. 5C and 5D, the address signals $A_0$ to $A_5$ are applied during the CLEAR mode, followed by the application of the address enable signals AE1 and $\overline{AE1}$ after a delay period $t_{AE}$ of approximately 400 microseconds, whereby the address signals are permitted to settle down before the address signals AE1 and $\overline{AE1}$ are applied. As will be explained in detail later, the delay period $t_{AE}$ is controlled by the address enable buffers 40. As the AE1 signal is applied, i.e. goes high, the clamping FET's $Q_{X1}$ to $Q_{X64}$ are rendered non-conductive, thereby isolating the biasing voltage $V_{CC}$ from the rows $X_1$ to $X_{64}$ of the memory matrix array 32. Further, the enable signal $\overline{AE1}$ is applied to a FET $Q_1$ of the row decoder 36, whereby the biasing voltage $V_{GG}$ is applied to the decode tree transistors. Thus, in the WRITE mode of operation, the clamping transistors $Q_{X1}$ to $Q_{X64}$ are biased to their non-conductive state and transistor $Q_1$ is biased to its conductive state, whereby the biasing voltage $V_{GG}$ may be applied to the selected row. Oppositely, during other periods of operation, the transistors $Q_{X1}$ to $Q_{X64}$ are rendered conductive, thereby clamping the conductors $X_1$ to $X_{64}$ of the matrix array 32 to a clamping voltage $V_{CC}$, and the transistor $Q_1$ is rendered nonconductive to isolate the biasing voltage $V_{GG}$ from the row decoder transistors A'. In this manner, an isolation is achieved in that the voltages developed within the row decoder are isolated from the voltages developed within the memory matrix array 32. In the selected row, the FET's of the decode tree apply the biasing voltage $V_{GG}$ of approximately −25 V across the conductive transistors A' to apply a voltage of substantially −15 V to −17 V to the memory gates of the selected row, the voltage difference due to the threshold voltages of these conductive transistors, thereby applying a total voltage of − 20 V to −22 V across the gate insulator of the memory FET's, with +5 V being applied to the source and substrate thereof. The signal levels from the row decode buffers $34_a$ to $34_f$ and their complements, determine the magnitude of the bias voltage applied to the addressed row conductor in the READ and WRITE modes. During the WRITE mode, the gate of the row decoder FET's A' are driven more negatively so the write bias voltage $V_W$ of −15 V to −17V is developed at the addressed row conductor. In the unselected rows, the biasing voltage $V_{GG}$ is applied across the non-conductive transistor(s) of the decode tree, and therefore a voltage of approximately +5 V remains established at the conductors of the unselected rows.

After the 32 bits of data have been clocked into the shift register 44, a data transfer signal $\overline{TR}$, as shown in FIG. 5E, is applied to the transfer gate 42 comprising, as shown in FIG. 4A, a FET $Q_{22}$, one for each of the columns $S_1$ to $S_{32}$ of the memory matrix array 32. While the data is being transferred, the phase 2 signal $\phi 2$ and the transfer signal $\overline{TR}$ both are low, as shown in FIGS. 5G and 5E, respectively, while the address enable signal AE is high, as shown in FIG. 5E; thus, these signals permit the column detection and store circuit 38 to be set in a state dependent upon the input data signal DW. With reference to FIG. 4A, the address enable signal AE2 renders the transistors $Q_{14}$ and $Q_{16}$ non-conductive, thus permitting the transistors $Q_{10}$ and $Q_{12}$ to be set as a function of the input data signal DW as applied through the transfer gate transistor $Q_{22}$. Further, during this data transfer period, the data is stored as a charge on an FET $Q_{34}$ within the shift register 34; in this regard, it is necessary that the phase 1 signal $\phi 1$, as shown in FIG. 5F, be high during this period.

If the level of the input data signal DW as derived from the input driver 46 is negative, i.e. the logic state is 0, then the gate of the transistor $Q_{10}$ likewise is negative, thus rendering the transistor $Q_{10}$ conductive and disposing the gate of the transistor $Q_{12}$ and the source electrode of the memory elements *m* connected to the corresponding column, to a potential of about +4.5 V. At this time, the memory write pulse $\overline{MW}$, as shown in FIG. 5I, assumes a value of approximately −25 V and is applied to each of the row decode buffers 34. As will be explained in detail with respect to FIG. 9, the row decode buffers respond to the memory write pulse $\overline{MW}$ and to one of the address signals $A_0$ to $A_5$, to generate output signals $A_1$ to $\overline{A_1}$, whereby the row decoder transistors of the selected branch are rendered conductive. As a result, the gates of the memory devices *m* of the selected row are disposed at a voltage in the range of −15 V to −17 V. Thus, in a manner similar to that described above with regard to FIG. 2B, a voltage $(V_G - V_S)$ in the order of −19.5 V to −21.5 V is disposed across the memory gate insulator, whereby the memory threshold voltage is shifted from the cleared of low state of approximately −2 V to −9 V, i.e. the high state. As explained in this specification, the high threshold voltage $V_T$ corresponds to a logic 0 at both the input and output data terminals.

Referring to the memory element $M_{1/2}$ as shown in FIG. 4B, a write high voltage $V_G$ is applied to its gate in a manner as explained above, while during the WRITE mode a clear signal $\overline{CL}$ of +5 V is applied to the substrate of each of the memory elements, a potential of approximately −20 V is applied through the transistors $Q_{S1}$ to $Q_{S32}$ to the drain electrodes of the memory elements, and a voltage $V_G$ of −17 V to −15 V is applied to the gate electrodes of the memory elements of the selected row. Under such conditions, a relatively high negative potential is disposed across the gate insulator and the threshold voltage thereof is shifted to its high state, thus writing a logic 0 on the memory element $M_{1/2}$.

For the case illustrated with respect to the memory element $M_{1/1}$, as shown in FIG. 4B, where the input data is a logic 1, i.e. the input signal of approximately +5 V is applied to the gate of the transistor $Q_{10}$, thereby rendering the transistor more conductive and permitting the gate of the transistor $Q_{12}$ and the source electrode of the memory devices of the associated column to be charged by the corresponding memory device to a potential in the order of −18 V. As a result, the voltage disposed across the insulating layer of the memory gate of the element $M_{1/1}$ is in the order of −2 V, which represent a threshold voltage drop below its gate voltage; as a result, the memory device $M_{1/1}$ remains in its low threshold voltage or cleared state. The operation of the memory element $M_{1/1}$ of a selected row corresponds to the write-inhibit stage discussed above with respect to FIG. 2C. Further, the low threshold voltage $V_T$ of a memory element corresponds to a logic 1 within the input and output data signals.

Further, with respect to FIG. 4B, the memory elements $M_{2/1}$ and $M_{2/2}$ coupled to an unselected row, have approximately +5 V applied to each of their gate electrode and substrate; as a result, 0 V is applied across their memory gate insulating layers and their threshold voltages $V_T$ remain undisturbed.

Figure 6:
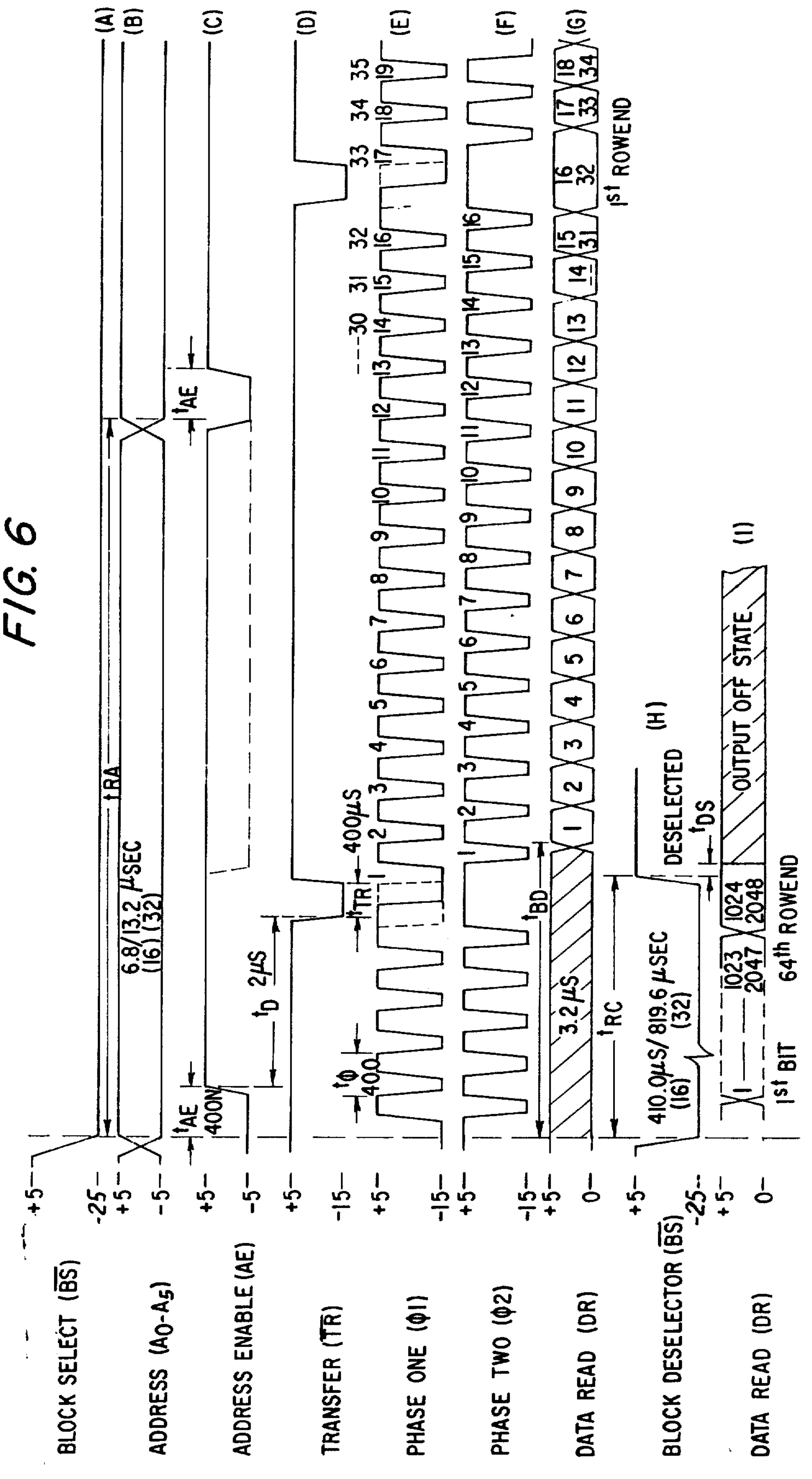

The operation of the memory assembly 30 to read data stored in the memory matrix array 32 now will be explained with respect to FIGS. 4A and 6A to 6I. In general, the memory matrix array 32 is read out by transferring in-parallel the 32 bits of information stored in the memory elements of a selected row through the column detection and store circuit 38, into the data shift register 44. In turn, the data is serially read out from the shift register 44 through the output driver 48. In a manner similar to that described above with respect to the WRITE mode, the first step in the READ mode is to select one of the rows $X_1$ to $X_{64}$ by applying the address signals $A_0$ to $A_5$, as shown in FIG. 6B, to the row decode buffers 34. In turn, the row decode address buffers 34 apply signals to charge the gates of the transistors of a branch of the row decoder 36 such that one of the rows $X_1$ to $X_{64}$ is selected. In the READ mode, a less negative potential (see FIG. 9) is applied to the row decoder FET's A' than that applied in the WRITE mode, whereby a read bias voltage $V_R$ in the order of -8 V is developed through the conductor to the gate electrodes of the memory elements of the addressed row. A delay period $t_{AE}$ is provided after the application of the address signals $A_0$ to $A_5$ (see FIGS. 6B and 6C) before the application of the enable signals AE1 and AE1 to the transistors $Q_{X1}$ to $Q_{X64}$ connected to the row conductors, whereby the transistors $Q_{X1}$ to $Q_{X64}$ are rendered non-conductive, releasing the corresponding row conductors from the clamping voltage $V_{CC}$ and permitting the source of the memory elements of the selected row to charge to the read bias. In particular, the transistors A' of the row decoder 36 corresponding to the selected row, are rendered substantially conductive, whereby the biasing potential $V_{GG}$ is applied to the gates of the memory elements *m* of the selected row, thus providing a read bias voltage to the memory elements. The gates of the memory elements of the unselected rows remain in a precharged state of +5 V.

The address enable buffer 40 delays the address delay signal $\overline{\textbf{AE2}}$ with respect to the application of address enable signal AE1, such that the transistors $Q_{14}$ and $Q_{16}$ (acting as initializing switches) are rendered conductive and the column detection and store circuit 38 remains disabled until the gates of the memory elements *m* of the selected row are permitted to charge to the read bias. After the delayed address signals AE are applied, the transistors $Q_{14}$ and $Q_{16}$ are rendered non-conductive, thereby releasing the gates of the transistors $Q_{10}$ and $Q_{12}$ from their clamped voltage $V_{CC}$, e.g. 5 V. The clear voltage $\overline{\textbf{CL}}$ applied to the conducter 39 provides the clamping voltage $V_{CC}$. At this time, the gates of the transistors $Q_{10}$ and $Q_{12}$ are permitted to charge negatively. The aforementioned delay between the address enable signals $\overline{\textbf{AE1}}$ and $\overline{\textbf{AE2}}$ ensures that the race to set either of the transistors $Q_{10}$ or $Q_{12}$ of the column detection and store circuit 38 is dependent only upon the state of the corresponding memory element *m* and is independent of the propagation delay of the memory bias through the row decoder 36.

The size (impedance) of transistor $Q_{18}$ appearing on the right-hand side, as shown in FIG. 4A, of the column detection and store circuit 38, is selected with respect to that of the transistor forming the memory element *m* to be read within the memory matrix array 32, such that either the gate of the transistor $Q_{12}$ or $Q_{10}$ will charge first dependent upon the threshold state of the memory element *m* being read. In particular, if the memory element *m* being read is disposed in its low threshold state, wherein its threshold voltage $V_{TM}$ equals −2 V to −4 V and its source voltage $V_S$ equals $V_R - V_{TM} = (-8\text{ V}) - (-4\text{ V}) = -4$ V, the source of the memory element *m* being read applies −4 V to the detection node and to the gate of the transistor $Q_{12}$. The transistors $Q_{12}$, $Q_{18}$ and $Q_{20}$ form a voltage divider; the voltage established at the point of interconnection between transistors $Q_{12}$ and $Q_{18}$ is in the order of +5 V when the gate of FET $Q_{12}$ is negative, i.e. FET $Q_{12}$ is conductive. As a result, the voltage appearing at the detection node during the low state serves to charge the gate of the transistor $Q_{12}$ negative first and render FET $Q_{12}$ conductive, thereby clamping the drain electrode of transistor $Q_{12}$ and the gate of the transistor $Q_{10}$ to the clear voltage $\overline{CL}$, e.g. +5 V. Therefore, the output as taken from the gate of the transistor $Q_{10}$ is disposed at a voltage of approximately +5 V, equivalent to the 1 state, for the condition wherein the memory element *m* is disposed in its low threshold state.

Conversely, when the memory element *m* is disposed in its high threshold state ($V_{TH} = -6$ V to −13 V) corresponding to data of a logical 0 level, the voltage developed at the source of the memory element *m* to be read assumes a value $V_S = V_R - V_{TH} = -8$ V $- (-13$ V$) =$ $+5$ V. As a result, the gate of transistor $Q_{10}$ will charge negative first, thereby clamping the gate of the transistor $Q_{12}$ to a positive voltage, rendering transistor $Q_{12}$ non-conductive and maintaining the output, i.e. the gate of transistor $Q_{10}$, at a slightly negative level, which represents the logical 0 level.

A significant advantage of operating in the READ mode as described above, is that the high threshold state of the memory elements *m* is enhanced, or in effect rewritten, during each READ mode. Thus, information may be written into a memory array 32 as described above and stored therein without fear that repeated read-out will diminish the level of the stored signal. Thus, signals may be written into such an array and stored thereon for prolonged periods of time and, in fact, the stored information, is enhanced or rewritten each time that a read-out of information is effected. In particular, during the READ mode as described above, a +5 V voltage is established at the source of the memory element, whereas a voltage in the order of −8V is established on its gate. As a comparison with the WRITE mode described above indicates, such voltages operate to dispose the memory element *m* to its high threshold state, establishing a corresponding charge upon its insulating storage layer. In its low threshold voltage state, a voltage of approximately −4 V is placed upon the source electrode to establish approximately −4 V across the storage insulating layer of the memory element; as a result, there is a minimum READ disturbance of the low threshold state information stored upon the memory element *m*. The enhancement writing, as described above, is more fully explained in the co-pending application Ser. No. 435,552, filed Jan. 22, 1974.

Subsequent to the application of the address enable signals AE as shown in FIG. 6C and the setting of the latch forming the column detection and store circuit 38, the transfer signal $\overline{TR}$ is applied as shown in FIG. 5D, whereby 32 bits of data as derived from the memory elements of the selected row are applied to the corresponding stages of the shift register 44. The phase 1 and phase 2 signals $\phi 1$ and $\phi 2$ as shown in FIGS. 6E and 6F, respectively, serve to shift the entered data from stage to stage of the shift register 44, whereby an output or data-read signal $D_R$, as shown in FIG. 6G, is derived.

Organization of the BORAM Memory System

With reference to FIG. 7, there is shown the organization of a plurality of the memory assemblies 30, shown individually in FIG. 3, into a block oriented random access memory (BORAM) system 70. As will be explained, the BORAM system 70 is configured in one illustrative embodiment to be capable of storing 16 megabits or 2 megawords, each word being comprised of 8 bits. As shown in FIG. 7, eight of the memory assemblies 30 are organized to form a single block 60. Each such block 60 of the BORAM system 70 is capable of storing 2,048 words, in which each word (or character) is eight bits long. As explained above, each mamory matrix array 32 of the assembly 30 is made up of memory elements disposed in a 32-column by 64-row matrix and is capable of storing 2,048 words. to accommodate this word and bit format, each such block 60 is accessed by a block-select signal $\overline{BS}$, whereby each of the eight bits of a word is written into a read from a corresponding one of the eight memory systems $30_1$ to $30_8$. As shown in FIG. 7, there are provided 1,024 blocks 60 which comprise 8,192 assemblies 30. In operation, a block-select signal $\overline{BS}$ indicative of one of the blocks $60_1$ to $60_{1,024}$ is generated to enable that block, whereby information may be read from or written into that block. As explained above, the assembly 30 is uniquely capable of serially or sequentially entering or reading data from the memory matrix array 32. It is contemplated that the address signals $A_0$ to $A_5$ applied to each of the assemblies 30 of a single block 60, are applied in unison, whereby the corresponding bit of a word is read out line-by-line in sequence so that the outputs derived in parallel from each of the assemblies 30 corresponding to the bits of a single word. Thus, any of the 1,024 blocks 60 may be selected at random and the information written onto or read from the access block 60 in a sequential or serial fashion.

Detailed Description of the Circuits of the Memory Assembly 30

The data input driver diagrammatically shown in FIG. 4A and identified generally by the number 46, is more specifically shown and described with respect to FIG. 8. The input driver circuit 46 serves the dual function of data input buffer and provides an "extra" shift register stage. This extra shift register stage is necessary because the data is taken off the input of each of the 32 stages of the shift register 44 during the write transfer. With 32 shift register stages, the data would be at the output of each of the 32 stages after 32 clock pulses. The aforementioned buffer function ensures that the data to be written into the memory array 32 is present at the input of each of the 32 stages when the write transfer signal $\overline{TR}$ occurs. The input driver circuit 46 responds quickly (fall time = 50 nsec) to the 2 MHz data input rate. Transistors $Q_{42}$ and $Q_{46}$ prevent the circuit from drawing power when the block is not selected ($\overline{BS}$ high). Power dissipation in this illustrative embodiment is 10 mW.

As shown in FIG. 8, the input driver circuit 46 is enabled by the application of the block-select signals $\overline{BS}$, applied to the transistors $Q_{42}$ and $Q_{46}$. Further, the phase 1 and phase 2 signals shown in FIGS. 5F and 5G are applied to the transistors $Q_{48}$ and $Q_{54}$ to synchronize the binary input data indicated by the letter DW with the operation of the shift register 44. In particular, the output of the input driver circuit 46, indicated by the letters DW', is applied in synchronism to the input, i.e. transistor $Q_{28}$, of the shift register 44.

Figure 11:
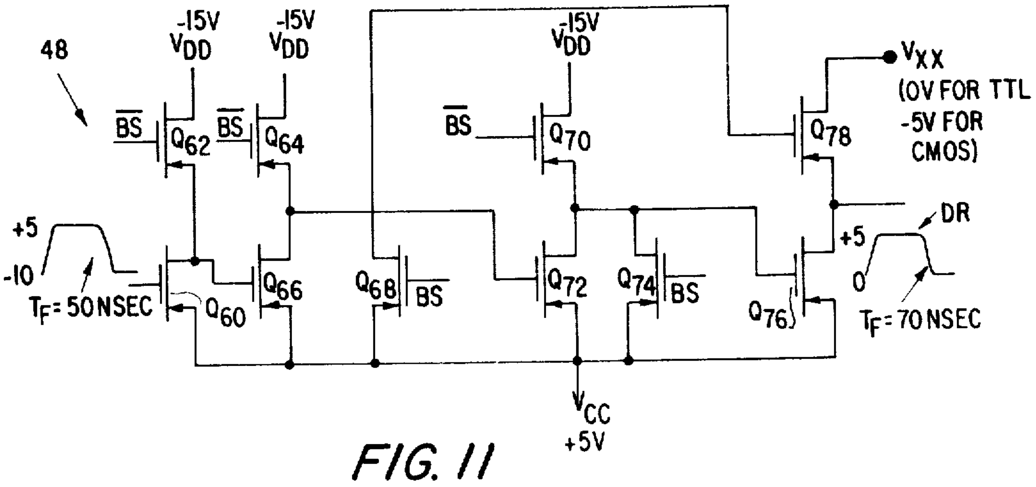
FIG. 11 is a schematic showing of the detailed circuit elements of the output driver diagrammatically shown in FIG. 3.

The output driver circuit diagrammatically shown in FIG. 3 and indicated generally by the reference numeral 48, is more particularly described with respect to FIG. 11. The output driver circuit 48 is a tri-state driver with TTL and CMOS compatible output. Transistors $Q_{68}$ and $Q_{74}$ clamp the gates of the output transistors $Q_{78}$ and $Q_{76}$ to +5 V when the block 60 is not selected ($\overline{BS}$ high). This ensures that both transistors $Q_{76}$ and $Q_{78}$ are off and the output mode (DR) is in a high impedance state when the block 60 is not selected, permitting WIRED/OR tying of the output data lines. The output driver circuit 48 is constrained at both ends. At its input, transistor $Q_{60}$ must be a relatively small transistor so as not to load the shift register 44 too heavily. At the output, transistors $Q_{76}$ and $Q_{78}$ are large to provide the necessary drive for the TTL output; as a result, a fall time can be achieved in the order of 70 nsec, which is adequate for a 2 MHz data rate. The output waveform shown in FIG. 11 ranges from 0 V to +5 V. The 0 V low level is determined by the supply voltage $V_{XX}$. This prevents drawing additional current through the diode clamp of the TTL buffer circuits. When $V_{XX}$ = −5 V, the output will swing a full +5 V to −5 V (although slower) which is compatible with the CMOS buffer, should that be used. In this way, the protective diode at the input of the CMOS buffer is not forward-biased, and no excess current flows. The power dissipation of the illustrative circuit 48 is 30 mW. An additional dynamic power $P_D = CV^2f$ must be included for a given capacitance load. For C = 50 pF, V = 5 V, $F$ = 2 MHz, then $P_D$ = 2.5 mW.

One of the row decode buffers diagrammatically shown in FIG. 3 is shown and described in detail with respect to FIG. 9. It is understood that there is one buffer circuit 34' for each address line ($A_0$ to $A_5$). The buffer circuit 34' received the ±5 V address signal and converts it to +5 V and −10 V PMOS level complementary outputs to operate the row decoder circuit 36. Fall times of 200 nsec (70 percent full value) are used since the X-decode circuits operate at $f/32$. A push-pull driver is used to minimize power. Transistors $Q_{96}$, $Q_{98}$ and $Q_{100}$, $Q_{102}$ allow (but do not require) the actuating signals $A_1$ and $\bar{A}_1$ applied to the address lines to go to −20 V during the WRITE mode. In other words, during the READ mode, the gates of the addressed row swing to a low enough voltage to read the state of the memory element $m$ without disturbing its memory state. But during the WRITE mode, the gates of the memory element $m$ within the addressed row swing further negative in order to permit data writing. Transistors $Q_{96}$, $Q_{98}$ and $Q_{100}$, $Q_{102}$ allow the addressed row to swing more negative (i.e. −20 V) to allow a write when the memory write signal ($\overline{MW}$) is present than when in a READ mode. Power dissipation during the READ mode is 2 mW for the entire row decode buffer circuit 34' shown in FIG. 9. During the WRITE mode, the power dissipation is increased to 7 mW because of the power dissipated in the MW circuit ($Q_{102}$, $Q_{100}$ or $Q_{98}$, $Q_{96}$).

Figure 10:
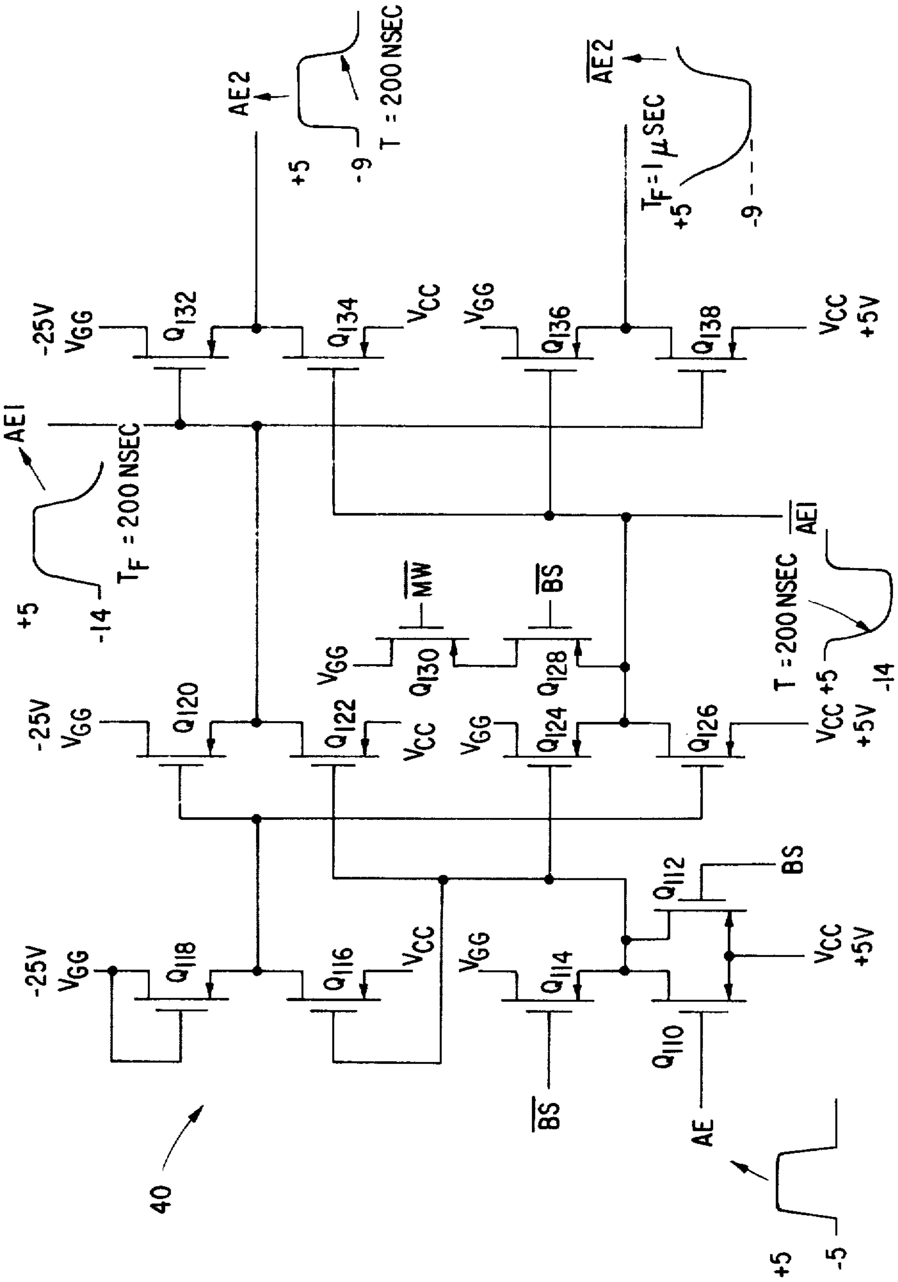
FIG. 10 is a schematic showing of the address enable buffer diagrammatically shown in FIG. 3.

The address enable buffer 40, diagrammatically shown in FIG. 3, is more fully shown and explained with respect to FIG. 10. The address enable buffer 40 has one input, the gate electrode of transistor $Q_{116}$, and four output signals AE1 and $\overline{AE1}$, and AE2 and $\overline{AE2}$, as derived, respectively, from the points of interconnection between the transistors $Q_{120}$ and $Q_{122}$, $Q_{124}$ and $Q_{126}$, $Q_{132}$ and $Q_{134}$, and $Q_{136}$ and $Q_{138}$. The basic function of the address enable circuit 40 is to buffer the signal AE and derive the signals AE1 and AE2 and their complements which are necessary for low power and proper timing. The circuit 40 includes three pairs of MOS-FET inverters, of which the second two pair provide the needed outputs. The address enable buffer circuit 40 need not be especially fast, therefore all the modes except signal $\overline{AE2}$ have a fall time of appoximately 200 nsec (+5 V to 70 percent of maximum negative swing). Signal AE2 has a fall time of 1 microsecond. It is much slower to provide the needed delay for proper operation of the column detection and store circuitry 38'. Transistor $Q_{112}$ ensures that AE1 and AE2 are low (logical 0) when its block 60 is not selected ($\overline{BS}$ high), or when AE is low. The condition That AE be low during the CLEAR mode is necessary to ensure that all rows of the memory array 30 are cleared during the CLEAR mode. Further, when a block 60 is not selected, no voltage is applied across the memory gate insulator. Transistors $Q_{130}$ and $Q_{128}$ force $\overline{AE1}$ low when the write signal $\overline{MW}$ is present and the block 60 is selected. This makes the −20 V write voltage available to the row decoder circuit 36 during the WRITE mode. An important feature of the address enable buffer 40 is that only the first pair of inverters ($Q_{110}$, $Q_{112}$ and $Q_{116}$, $Q_{118}$) dissipates power and only one of the pair of inverters is conducting at any one time. This is possible because the availability of complementary signals prevents both transistors in each of the remaining four inverters from conducting simultaneously. Estimated power dissipation during the READ mode is 5 MW for the address enable buffer 40, as shown in FIG. 10. During the WRITE mode, the power dissipation is not increased since the $\overline{MW}$ circuit ($Q_{130}$, $Q_{128}$) is only connected to the $\overline{AE1}$ signal which is always negative during the WRITE mode. Thus, no DC current path exits and the power is not increased.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A memory system for storing an input signal comprising a plurality of bits comprising:

a. a matrix of memory elements disposed in a matrix of rows and columns, each of said memory elements capable of being disposed to at least first and second states corresponding to the input signal;

b. address means responsive to an address signal designating at least one of the matrix rows, for actuating the designated row of said memory matrix to facilitate reading and writing of data onto the memory elements of the designated row;

c. sequential storage means comprising a plurality of stages, each stage corresponding to a column of said memory matrix, said sequential storage means disposed to receive the input signal in a sequential fashion and for storing a portion of the input signal in each of said stages, said sequential storage means upon the completion of the entry of the portions of the input signal in a given number of its stages effecting a transfer of the signal portions along corresponding columns of said memory matrix, whereby the portions of the input signal are written onto said memory elements of the addressed row; and d. intermediate storage and detection means interconnected between said sequential storage means and said memory matrix for temporarily storing the portions of the input signal, and for detecting whether said memory elements of the designated row are in their first and second stages and for providing corresponding first and second outputs to said corresponding stages of said shift register, after entry of the outputs from said memory matrix said sequential storage means sequentially transferring the outputs from said sequential storage means to provide a composite output comprised of the first and second outputs as derived in parallel from said memory elements of said matrix columns.

2. A block oriented memory system comprising a plurality of memory blocks for writing the input signal in binary form and reading out data words comprising a selected number of bits, each of said blocks comprising a plurality of the memory systems as claimed in claim 1, one for each bit of the data, each of said memory blocks responsive to a unique block signal whereby the bits of the data words are written in and read out in parallel to and from corresponding memory systems of that memory block.

3. The memory system as claimed in claim 1, wherein each of said memory elements comprises an MNOS field effect transistor.

4. The memory system as claimed in claim 2, wherein each of said MNOS field effect transistors comprises a drain, a source and a gate terminal and is disposed on a common semiconductive substrate with the other MNOS field effect transistors of said matrix.

5. The memory system as claimed in claim 4, wherein each of said MNOS field effect transistors includes a fourth terminal connected to said substrate of said MNOS field effect transistor.

6. The memory system as claimed in claim 5, wherein there is included means for applying a $\overline{CL}$ signal to each of said fourth terminals of said MNOS field effect transistors of said matrix, whereby each of said MNOS field effect transistors is disposed to its first state.

7. The memory system as claimed in claim 1, wherein there is further included means for writing associated with said address means for applying a write biasing signal to the actuated row of said memory matrix to effect the writing of the input signal as applied by said intermediate storage and detection means to said memory elements of said designated row.

8. The memory system as claimed in claim 1, wherein said intermediate storage and detection means comprises a plurality of bistable circuits, each coupled to a corresponding column of said matrix and comprising first and second switches, each of said first and second switches comprising a first, control terminal for determining the impedance presented between its second and third terminals, said first terminal of said second switch being coupled to a first, detection node connected with said second terminal of said first switch and with its corresponding column of said matrix, said first electrode of said first switch being coupled to a second node connected with said second terminal of said second switch and further, providing the output of said bistable circuit.

9. The memory system as claimed in claim 8, wherein said first and second switches each comprise an MNOS field effect transistor.

10. The memory system as claimed in claim 8, wherein each of said bistable circuits comprises first biasing means for applying a first biasing voltage to said second node, of a magnitude selected such that if said one memory element coupled by said column to said first node is in its first state, said second switch is rendered conductive to apply a second biasing voltage to said first electrode of said first switch disposing said first switch to its non-conductive state and providing a first output signal indicative of the first state of said memory element, and that if said one memory element is in its second state, said first switch is rendered conductive first thereby applying said second biasing voltage to said first electrode of said second switch to render said second switch non-conductive and providing the second biasing voltage as the second output of said bistable circuit.

11. The memory system as claimed in claim 10, wherein said bistable circuit further comprises switch means interconnected between each of said first electrodes of said first and second switches and the second biasing voltage, and address enable means for developing and applying an address enable signal to said switch means to render said switch means non-conductive after the application of the address signal to said address means, whereby said bistable circuit may respond to the outputs of said memory elements.

12. The memory system as claimed in claim 10, wherein each of said memory elements comprises an MNOS transistor capable of being disposed to a high threshold and a low threshold state, and comprising source, drain and gate electrodes, said address means comprising means for applying a read-bias voltage to said designated row of a suitable voltage such that said sources of said MNOS field effect transistors disposed in their low state will dispose said bistable circuit to provide its first output and said MNOS field effect transistors in their high state will dispose said bistable circuit to provide its second output.

13. The memory system as claimed in claim 12, wherein the read-bias voltage established upon the gate electrodes of said MNOS field effect transistors and the voltage to which the MNOS field effect transistors and the voltage to which the sources of said aforementioned MNOS field effect transistors charge in their high state, re-write the input signals into said MNOS field effect transistors devices upon each read-out of data therefrom.

14. The memory system as claimed in claim 1, wherein there is included means for developing an address enable signal, and first and second clamping means associated respectively with said columns and rows of said matrix for selectively applying first and second biasing voltages to said columns and rows of said matrix, respectively, said address enable means applying the address enable signal to each of said first and second clamping means after the application of the address signals to said address means to render said first and second clamping means non-conductive and to disconnnect said rows and conductors from the first and second biasing voltages, respectively.

15. The memory system as claimed in claim 14, wherein there is further included address buffer means for receiving and storing the address signal, said address means responsive to the address signal as stored in said address buffer means for actuating the designated row of said memory matrix in accordance with the address signal.

16. The memory system as claimed in claim 15, wherein there is included transfer means for effecting transfer of the input signals from said sequential storage means through said intermediate storage and detection means to said columns of said memory matrix after the application of the address enable signals to said first and second clamping means.

17. The memory system as claimed in claim 16, wherein there is further included write means for applying a WRITE signal after the transfer of the input signals to said columns of said matrix, to said address buffer means to effect transfer of the address signals to said address means, whereby the designated row is actuated and said memory elements are disposed to one of their first and second states in accordance with the input signals transferred thereto along said columns of said memory matrix.

* * * * *